US008022124B2

(12) United States Patent
Rohde et al.

(10) Patent No.: US 8,022,124 B2
(45) Date of Patent: Sep. 20, 2011

(54) PROCESS FOR PREPARATION OF ETHYLENE POLYMERS FOR BLOWN FILMS

(75) Inventors: Wolfgang Rohde, Speyer (DE); Lutz-Gerd Heinicke, Eschborn (DE); Rainer Karer, Kaiserslautern (DE); Manfred Hecker, Neustadt (DE)

(73) Assignee: Basell Polyolefine GmbH, Wesseling (DE)

( * ) Notice: Subject to any disclaimer, the term of this patent is extended or adjusted under 35 U.S.C. 154(b) by 489 days.

(21) Appl. No.: 12/223,234

(22) PCT Filed: Jan. 24, 2007

(86) PCT No.: PCT/EP2007/000577
§ 371 (c)(1),
(2), (4) Date: Jul. 25, 2008

(87) PCT Pub. No.: WO2007/088000
PCT Pub. Date: Aug. 9, 2007

(65) Prior Publication Data
US 2010/0317755 A1    Dec. 16, 2010

Related U.S. Application Data

(60) Provisional application No. 60/782,095, filed on Mar. 14, 2006.

(30) Foreign Application Priority Data

Jan. 31, 2006 (DE) .......................... 10 2006 004 705

(51) Int. Cl.
*C08K 5/50* (2006.01)
*C08J 9/00* (2006.01)
(52) U.S. Cl. .......................................... 524/154; 521/80
(58) Field of Classification Search ................... 524/154
See application file for complete search history.

(56) References Cited

U.S. PATENT DOCUMENTS

| 3,242,150 | A | 3/1966 | Scoggin ..................... 260/88.2 |
| 3,248,179 | A | 4/1966 | Norwood ..................... 23/285 |
| 4,037,042 | A | 7/1977 | Mueller-Tamm et al. .... 526/106 |
| 4,182,810 | A | 1/1980 | Willcox ..................... 526/64 |
| 4,284,527 | A | 8/1981 | Pullukat et al. ............... 252/430 |
| 4,806,513 | A | 2/1989 | McDaniel et al. ............. 502/107 |
| 4,814,308 | A | 3/1989 | Konrad et al. ................ 502/107 |
| 5,026,795 | A | 6/1991 | Hogan ............................. 526/74 |
| 5,414,064 | A * | 5/1995 | Lux et al. ..................... 526/215 |
| 5,739,266 | A * | 4/1998 | Piana ........................... 528/483 |
| 6,518,375 | B1 | 2/2003 | Monoi et al. .................. 526/104 |
| 6,632,896 | B1 * | 10/2003 | Almquist et al. ............... 526/96 |
| 6,646,069 | B2 | 11/2003 | Monoi et al. .................. 526/105 |
| 6,943,227 | B2 | 9/2005 | Ishihama et al. ............... 526/160 |
| 7,019,089 | B2 | 3/2006 | Schneider et al. ............. 526/113 |
| 2002/0042482 | A1* | 4/2002 | Monoi et al. .................. 526/106 |
| 2008/0097054 | A1* | 4/2008 | Amos et al. ................... 526/135 |

FOREIGN PATENT DOCUMENTS

| BE | A-861-275 | 3/1978 |
| EP | 229368 | 12/1986 |
| WO | WO 97/48743 | 12/1997 |
| WO | WO 01/40326 | 6/2001 |
| WO | WO 01/70827 | 9/2001 |
| WO | WO 2005/054315 | 6/2005 |
| WO | WO 2005054315 A1 * | 6/2005 |
| WO | WO 2006/114209 | 11/2006 |
| WO | PCT/EP2007/000577 | 6/2007 |

OTHER PUBLICATIONS

Manfred Fleissner, "Elongational Flow of HDPE Samples and Bubble Instability in Film Blowing," *Intern. Polymer Processing II* (1988) ¾, p. 229.
M. P. McDaniel, "Supported Chromium Catalysts for Ethylene Polymerization," *Advances in Catalysis* (Copyright 1985), vol. 33, pp. 48-61.
F. Gugumus, "Aspects of the impact of stabilizer mass on performance in polymers 3. Performance of HALS in polyethylene," *Polymer Degradation and Stability* 69 (2000) 93-104.

* cited by examiner

*Primary Examiner* — Ling-Siu Choi
*Assistant Examiner* — Hui Chin
(74) *Attorney, Agent, or Firm* — Dilworth IP, LLC

(57) ABSTRACT

Process for preparation of ethylene homopolymers or copolymers, comprising the steps of a) polymerization of ethylene or of ethylene with one or more other 1-olefins in the presence of a chromium catalyst at temperatures of from 20 to 200° C. and at pressures of from 0.1 to 20 MPa, where the chromium catalyst can be prepared via application of one or more chromium compounds to a silicate support and subsequent thermal activation under oxidative conditions at temperatures of from 620 to 900° C.; b) mixing of the polyethylene in the melt in the presence of from 1000 to 2000 ppm of an antioxidant comprising at least one sterically hindered phenol and comprising at least one phosphite in a mixing ratio of from 1:5 to 5:1, with specific energy input of at least 0.17 kWh/kg.

10 Claims, 1 Drawing Sheet

PROCESS FOR PREPARATION OF ETHYLENE POLYMERS FOR BLOWN FILMS

CROSS-REFERENCE TO RELATED APPLICATIONS

This application is the U.S. national stage under 35 U.S.C. §371 of International Application PCT/EP2007/000577, filed Jan. 24, 2007, claiming priority to German Patent Application No. 10 2006 004 705.2, filed Jan. 31, 2006, and provisional U.S. Appl. No. 60/782,095, filed Mar. 14, 2006; the disclosures of International Application PCT/EP2007/000577, German Patent Application No. 10 2006 004 705.2, and provisional U.S. Appl. No. 60/782,095, each as filed, are incorporated herein by reference.

The invention relates to a process for preparation of ethylene homopolymers or copolymers, comprising the steps of
a) polymerizing ethylene or ethylene with one or more other 1-olefins in the presence of a chromium catalyst at temperatures of from 20 to 200° C. and at pressures of from 0.1 to 20 MPa, where the chromium catalyst can be prepared via application of one or more chromium compounds to a silicate support and subsequent thermal activation under oxidative conditions at temperatures of from 620 to 900° C.,
b) mixing of the polyethylene in the melt in the presence of from 1000 to 2000 ppm of an antioxidant comprising at least one sterically hindered phenol and comprising at least one phosphite in a mixing ratio of from 1:5 to 5:1 by weight, with specific energy input of at least 0.17 kWh/kg.

Polyethylene is used in the blown-film process to give films. In this process, as a function of process conditions and grade of polyethylene, instability of the film bubble can occur, becoming noticeable via what is known as pumping of the bubble, and leading to variations in film thickness. Sometimes this pumping of the film bubble becomes so severe that break-off of the film occurs and processing becomes impossible.

It is known that blowing performance can be improved by using an increased proportion of long-chain branching (M. Fleißner Intern. Polymer Processing II (1988) 3/4, p. 229). For example, EP-A-0700769 uses controlled oxygen feed to the PE melt during the compounding process in order to generate this long-chain branching.

WO 02/02652 teaches that specific titanized Cr catalysts prepared in a multistage process give products with high bubble stability. A disadvantage of these catalysts is that their preparation is very complicated and therefore expensive.

During development of a polyethylene for production of blown films, it has now been found that polyethylenes with broad molar mass distribution do not give sufficient bubble stability. Nor was it possible to prepare a polyethylene with the desired properties using oxygen feed to generate long-chain branching according to EP-A-700 769.

It is therefore an object of the present invention to find a process which can prepare a polyethylene which makes wide processing latitude available and has only light tendency, or no tendency at all, to cause film-bubble instability.

The invention is based on the discovery that polyethylenes with excellent bubble stability are obtained together with good film properties only when using pure chromium catalysts, which give a narrower molar mass distribution than those with additional co-doped elements, in contrast to the teaching of WO 02/02652, and also using further measures during the compounding process.

Accordingly, it has been found that the object is achieved via a process for preparation of ethylene homopolymers or of ethylene copolymers, comprising the steps of
a) polymerization of ethylene or of ethylene with one or more other 1-olefins in the presence of a chromium catalyst at temperatures of from 20 to 200° C. and at pressures of from 0.1 to 20 MPa, where the chromium catalyst can be prepared via application of one or more chromium compounds to a silicate support and subsequent thermal activation under oxidative conditions at temperatures of from 620 to 900° C.,
b) mixing of the polyethylene in the melt in the presence of from 1000 to 2000 ppm of an antioxidant comprising at least one sterically hindered phenol and comprising at least one phosphite in a mixing ratio of from 1:5 to 5:1, with specific energy input of at least 0.17 kWh/kg.

Figure 1:
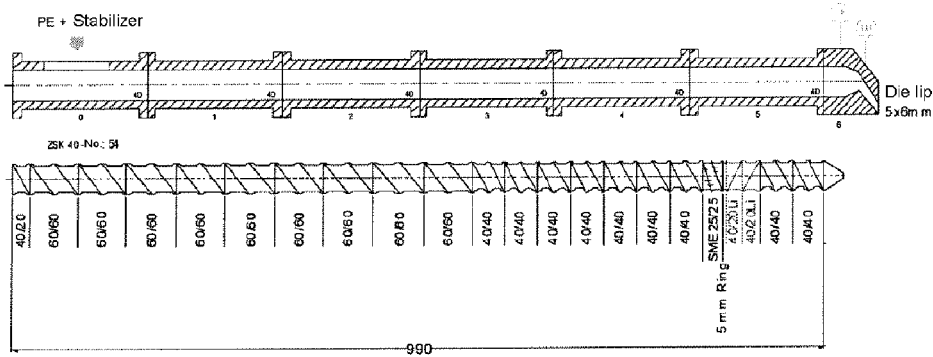
FIG. 1 illustrates a ZSK 40 extruder using screw A in a compounding process.

According to the invention, a chromium catalyst is used during the polymerization and can be prepared via application of one or more chromium compounds to a silicate support and subsequent thermal activation.

The support is a substantially pure silicate support, thus differing from a cogel with other transition metal oxides, such as those of titanium, but modification of the pore surface with compounds of the elements boron (BE-A-861 275), aluminum (U.S. Pat. No. 4,284,527), silicon (EP-A 0 166 157), or phosphorus (DE-A 36 35 710) is possible. The silicate can be spherical or granular. Preference is given to spherical or granular silica gels, and the former may also have been spray-dried.

The silicate supports can be prepared by the usual known processes. Preferred support materials are fine-particle silica xerogels, the preparation of which by way of example can follow DE-A 25 40 279.

Other advantageous supports are those described in WO 97/48743. These are fragile, agglomerated catalyst support particles whose average particle size is from 2 μm to 250 μm and whose specific surface area is from 1 $m^2$/g to 1000 $m^2$/g, obtained via spray drying of primary particles whose average particle size is from 3 μm to 10 μm. The primary particles for preparation of the agglomerated catalyst support particles here are formed using a slurry of dry- and optionally wet-ground inorganic oxide particles in water.

The silica hydrogel is preferably prepared via acidic or basic precipitation from water glass. The hydrogel is preferably prepared via introduction of a sodium water glass solution or potassium water glass solution into a stream of a mineral acid, e.g. sulfuric acid, subjected to rotation. The resultant silica hydrosol is then sprayed by means of a nozzle into a gaseous medium. The nozzle orifice used in this process gives, once the hydrosol has solidified in the gaseous medium, hydrogel particles whose average particle size can be varied in the range from by way of example 1 mm to 20 mm, via selection of the nozzle. The average particle size of the hydrogel particles is preferably in the range from 2 mm to 10 mm, preferably in the range from 5 mm to 6 mm.

There are other known processes in the prior art which can be used for preparation of the hydrogel, alongside the spraying of a hydrosol. By way of example, suitable supports can also be prepared using hydrogels, preferably silica hydrogels, which can be prepared in a manner known in the prior art, by way of example from silicon-containing starting materials, such as alkali metal silicates, or from alkyl silicates, and/or from alkoxysilanes.

The size of hydrogel particles which can be used can vary widely, for example in ranges from a few micrometers to a few centimeters. The size of hydrogel particles which can be used is preferably in the range from 1 mm to 20 mm, but it is also possible to use what are known as hydrogel cakes. Hydrogel particles whose size is in the range $\leq 6$ mm can be used advantageously. These are produced, by way of example, as by-product in the production of granular supports.

It is preferable to prepare a fine-particle hydrogel whose solids content is in the range from $>0\%$ by weight to $\leq 25\%$ by weight, preferably from 5% by weight to 15% by weight, with preference in the range from 8% by weight to 13% by weight, particularly preferably in the range from 9% by weight to 12% by weight, very particularly preferably in the range from 10% by weight to 11% by weight, calculated as oxide.

The hydrogel is then, if appropriate, washed until the sodium content has reached 0.1% by weight. Any desired method can be used for the washing of the hydrogel particles, preferably using weakly ammoniacal water at about 50° C. to 80° C. in a continuous-counterflow process.

The preferably spherical hydrogel particles can be sieved, and fractions with preferred diameter can be isolated.

Prior to the drying process, the water is preferably removed via extraction with an organic solvent, such as methanol or isopropanol. This can take place continuously or batchwise. A silicate xerogel suitable as support is produced from the hydrogel via drying.

Support particles which can preferably be used for the slurry polymerization process can preferably have average particle sizes up to 350 μm, their average particle size preferably being in the range from 30 μm to 150 μm. Support particles which can preferably be used for the fluidized-bed gas-phase polymerization process preferably have an average particle size in the range from 30 μm to 120 μm. Support particles which can preferably be used for the suspension polymerization process preferably have an average particle size in the range from 30 μm to 300 μm. Support particles which can preferably be used for the loop polymerization process preferably have an average particle size in the range from 30 μm to 150 μm. Support particles which by way of example can be used for the polymerization process in fixed-bed reactors preferably have average particle sizes $\geq 100$ μm, with preference $\geq 300$ μm, with greater preference in the range from 1 mm to 10 mm, with particular preference in the range from 2 mm to 0.8 mm, and with more preference in the range from 2.5 mm to 5.5 mm.

The pore volume of the support particles prepared by this process is usually in the range smaller than 2.5 ml/g, preferably in the range smaller than 1.6 ml/g, and the pore volume of the support particles is preferably in the range smaller than 1.2 ml/g, particularly preferably in the range from 0.8 ml/g to 1.25 ml/g.

The pore diameter of the support particles prepared is preferably in the range smaller than 200 Å, the pore volume of the support particles is preferably in the range smaller than 150 Å, particularly preferably in the range from 50 Å to 130 Å.

The productivity of catalysts based on granular supports is often lower in comparison with spray-dried supports. Furthermore, granular supports often have higher strength than spray-dried supports. The surprising advantage of the supports prepared by this process in comparison with granular supports is that particularly preferred embodiments of these have higher catalytic activity than granular supports, with comparable strength.

The surface of the inorganic support can also be varied widely via the drying process, in particular via the spray drying process. It is preferable to produce particles of the inorganic support, in particular of discharge from a spray tower, whose surface area is in the range from 100 m²/g to 1000 m²/g, preferably in the range from 150 m²/g to 700 m²/g, and particularly preferably in the range from 200 m²/g to 500 m²/g. Supports which can be used for the polymerization process preferably have a surface area in the range from 200 m²/g to 500 m²/g. The specific surface area of the support particles is based on the surface of the support particles determined by means of nitrogen adsorption in accordance with the BET method.

The bulk density of the inorganic supports for catalysts is preferably in the range from 250 g/l to 1200 g/l, and this bulk density can vary as a function of the water content of the support. The bulk density for support particles comprising water is preferably in the range from 500 g/l to 1000 V, more preferably in the range from 600 g/l to 950 g/l, and particularly preferably in the range from 650 V to 900 g/l. For supports which comprise no water or have very low water content, the bulk density is preferably from 250 g/l to 600 V.

The compounds of chromium are then applied to the xerogel to form a chromium catalyst precursor.

It is preferable to use chromium compounds whose valency is smaller than six, particularly preference being given to Cr(III) compounds. Examples of these are chromium hydroxide, and also soluble salts of trivalent chromium with an organic or inorganic acid, e.g. acetates, oxalates, sulfates, or nitrates. Particular preference is given to salts of acids which on activation are substantially converted into chromium(VI) leaving no residue, an example being chromium(III) nitrate nonahydrate. Chelate compounds of chromium can also be used, examples being chromium derivatives of β-diketones, of β-ketoaldehydes, or of β-dialdehydes, and/or complexes of chromium, such as chromium(III) acetylacetonate or hexacarbonylchromium, or else organometallic compounds of chromium, such as bis(cyclopentadienyl)chromium(II), organic esters of chromic acid, or bis(arene)chromium(0).

The chromium compound is preferably applied from a solution of strength from 0.05% by weight to 15% by weight, in a polar organic solvent, preferably in a protic organic solvent, particularly preferably in a $C_1$-$C_4$ alcohol, of a chromium compound which under the conditions of activation converts to chromium(VI) oxide, where the water content of the respective solvent is preferably not more than 5% by weight. The support can also be loaded without solvent, for example via mechanical mixing.

The concentration in which the chromium compound is present is usually from 0.05 to 20% by weight, preferably from 0.1 to 15% by weight, and particularly preferably from 0.5 to 10% by weight, based on the solvent. The amount of solution used during the doping process is preferably smaller than the pore volume of the support.

Finally, the chromium catalyst precursor is subjected to thermal activation under oxidative conditions at temperatures of from 620 to 900° C., forming the finished catalyst.

Once the chromium compound, hereinafter termed chromium doping, has been applied, the support is substantially freed from the solvent, preferably at temperatures of from 20 to 150° C. and at pressures of from 10 mbar to 1 mbar, to the extent that this is necessary for the subsequent calcination process. The resultant catalyst precursor can be completely dry or can have a certain level of residual moisture. The remaining volatile constituents present preferably amount to not more than 20% by weight, in particular not more than 10% by weight, based on the as yet unactivated catalyst precursor comprising chromium.

The chromium-doped catalyst precursor can be thermally activated immediately, or else, in another intermediate step, can be calcined beforehand in a water-free inert gas atmosphere at temperatures above 280° C. The calcination process is preferably carried out at temperatures of from 280 to 800° C. in a fluidized bed for 10 to 1000 minutes.

The final calcination of the chromium-doped catalyst precursor takes place at temperatures of from 620 to 900, preferably of from 620 to 850° C., more preferably from 630 to 800° C., particularly preferably from 630 to 750° C. Calcination means thermal activation of the catalyst in an oxidizing atmosphere, whereupon the chromium compound applied is converted to the hexavalent state, i.e. is activated, to the extent that this is not the case by this stage. The terms calcination and activation are used synonymously in this connection. The choice of the calcination temperature is prescribed via the properties of the polymer to be prepared and the activity of the catalyst. It is delimited at the upper and lower end via the properties of the polyethylene to be prepared. The effect of the calcination conditions on the catalyst are in principle known and are described by way of example in Advances in Catalysis, Vol. 33, page 48 ff. The calcination process preferably takes place in an oxygen-containing atmosphere. An advantageous method here heats the material to the appropriate calcination temperature in an anhydrous gas stream comprising a concentration of more than 10% by volume of oxygen for from 10 to 1000 minutes, in particular from 150 to 750 minutes, and then cools it to room temperature, giving the chromium catalyst to be used according to the invention. The activation process can take place in a fluidized bed and/or in a stationary bed. Preference is given to thermal activation taking place in fluidized-bed reactors.

The catalyst precursor can moreover be doped with fluoride. Doping with fluoride can take place during preparation of the support, during the doping process, or during the activation process. The fluoride doping here is particularly preferably carried out together with the activation at temperatures in the range from 350° C. to 1050° C. in air. Fluorinating agents have preferably been selected from the group consisting of $ClF_3$, $BrF_3$, $BrF_5$, $(NH_4)_2SiF_6$ (ammonium hexafluorosilicate, abbreviated to ASF), $NH_4BF_4$, $(NH_4)_2AlF_6$, $NH_4HF_2$, $(NH_4)_3PF_6$, $(NH_4)_2TiF_6$ and $(NH_4)_2ZrF_6$. Fluorinating agents that can be used with preference are those selected from the group consisting of $(NH_4)_2SiF_6$, $NH_4BF_4$, $(NH_4)_2AlF_6$, $NH_4HF_2$, $(NH_4)_3PF_6$. $(NH_4)_2SiF_6$ can be used with particular preference. The amount generally used of the fluorinating agent is in the range from 0.3% by weight to 10% by weight, preferably in the range from 0.5% by weight to 8% by weight, particularly preferably in the range from 0.5% by weight to 5% by weight, very particularly preferably in the range from 0.5% by weight to 3% by weight, based on the total weight of the catalyst used. It is preferable to use from 1% by weight to 2.5% by weight, based on the total weight of the catalyst used. The properties of the polymers prepared can be varied as a function of the amount of fluoride in the catalyst. Fluorination of the catalyst system can advantageously give a narrower molar mass distribution of polymers obtainable via a polymerization reaction, when comparison is made with a polymerization reaction via an unfluorinated catalyst.

After the calcination process, reduction of the calcined precatalyst can take place, if appropriate, for example using reducing gases, such as CO or hydrogen, preferably at from 350 to 950° C., in order to obtain the actual catalytically active species. However, the reduction reaction can also be delayed until the polymerization reaction has begun, via reducing agents present in the reactor, e.g. ethylene, alkyl metal compounds, and the like.

The chromium content of the finished catalyst is usually in the range from 0.1 to 5% by weight, preferably from 0.5 to 4% by weight, particularly preferably from 1 to 3% by weight, based on the support. Another constituent of the catalyst alongside chromium can be other elements, such as Mg, Ca, Sr, Ba, B, Al, P, Bi, Sc, Ti, V, Mn, Fe, Co, Ni, Cu, Zn, Zr, Nb, Mo, Ru, Rh, Pd, Hf, Ta, and W, and also, if appropriate, one or more activators. The elements mentioned here can be a constituent of the hydrogel or can be applied via subsequent doping of the xerogel particles. It is preferable that no transition metal, particular preferable that no of the other elements mentioned is present in the catalyst apart from chromium.

The chromium catalyst can be subjected to a prepolymerization process prior to use, and prepolymerization of the supported catalyst system is preferred here. This prepolymerization can take place in the gas phase, in suspension, or in the monomer (bulk), and this prepolymerization can take place continuously in a prepolymerization system upstream of the polymerization reactor, or in a batch-prepolymerization system independent of operation of the reactor.

The polymerization reaction can be carried out by any of the known industrial polymerization processes at temperatures in the range from 0 to 200° C., preferably from 25 to 150° C., and particularly preferably from 40 to 130° C., and under pressures of from 0.05 to 10 MPa and particularly preferably from 0.3 to 4 MPa. The polymerization reaction can be carried out batchwise or preferably continuously in one or more stages. Solution processes, suspension processes, stirred gas-phase processes, or fluidized-bed gas-phase processes can be used. Processes of this type are well known to the person skilled in the art.

Among the polymerization processes mentioned, preference is given to gas-phase polymerization, in particular in fluidized-bed gas-phase reactors, to solution polymerization, and also to suspension polymerization, in particular in loop reactors and in stirred-tank reactors.

In the case of the suspension polymerization reactions, the polymerization is usually carried out in a suspension medium, preferably in an inert hydrocarbon, such as isobutane, or in mixtures of hydrocarbons, or else in the monomers themselves. The suspension polymerization temperatures are usually in the range from −20 to 115° C., and the pressure is usually in the range from 0.1 to 10 MPa. The solids content of the suspension is generally in the range from 10 to 80%. Operations can be carried out either batchwise, e.g. in stirred autoclaves, or else continuously, e.g. in tubular reactors, preferably in loop reactors. Operations can in particular be carried out by the Phillips PF process as described in U.S. Pat. Nos. 3,242,150 and 3,248,179.

Particular preference is given to polymerization in the gas phase, and this can involve a stirred gas-phase reactor or a fluidized-bed gas-phase reactor. An individual reactor or a reactor cascade can be involved here.

Particular preference is given to polymerization in a single fluidized-bed gas-phase reactor in which the circulated reactor gas is introduced to the lower end of a reactor and in turn removed at its upper end. In the application for polymerization of ethylene, the circulated reactor gas is usually a mixture composed of ethylene, and, if appropriate, of other 1-olefins, and if desired of a molecular weight regulator, such as hydrogen, and of inert gases, such as nitrogen and/or lower alkanes. The velocity of the reactor gas must be high enough to fluidize a loose bed of mixed solids composed of small-particle polymer located in the tube and serving as polymerization zone, and secondly must be high enough to dissipate the heat of polymerization effectively (non-condensed mode). The polymerization reaction can also be carried out in what is known as the condensed or supercondensed mode, in which a portion of the circulating gas is cooled below the dew point and is returned in the form of a two-phase mixture into the reactor, in order to make additional use of the enthalpy of vaporization in order to cool the reaction gas.

In fluidized-bed gas-phase reactors it is advisable to operate at pressures of from 0.1 to 10 MPa, preferably from 0.5 to 8 MPa, and in particular from 1.0 to 3 MPa. The cooling capacity is moreover dependent on the temperature at which the (co)polymerization reaction is carried out in the fluidized bed. It is advantageous for the process to operate at temperatures of from 30 to 160° C., particularly preferably from 65 to 125° C., and it is preferable to set temperatures in the upper part of this range for relatively high-density copolymers and to set temperatures in the lower part of this range for relatively low-density copolymers.

It has been found that larger amounts of antistatic agent have an adverse effect on polyethylene bubble stability. In contrast, smaller amounts of antistatic agent lead to formation of deposits and accretions, which not only adversely affect the polymerization process but also impair product properties. Products with particular bubble stability can be obtained if the polymerization reaction takes place in the presence of from 1 to 12 ppm, preferably from 3 to 10 ppm, of an antistatic agent.

Examples of antistatic agents that can be used are disclosed in EP-A 0 229 368, U.S. Pat. Nos. 5,026,795 and 4,182,810. An example which may be mentioned here of a commercial product that can be used is Stadis 450 or Costelan AS100, obtainable from Dupont or from Costenoble, these consisting in essence of a polysulfone copolymer, of a polyamine, and of a long-chain sulfonic acid. Examples of alternative antistatic agents are ZnO and/or MgO. The water content of ZnO or MgO is preferably smaller than 0.5% by weight, with preference smaller than 0.3% by weight, based on the respective total weight.

Further preference is given to a mixture composed of a metal salt derived from medialanic acid

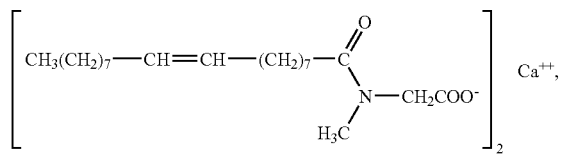

and from a metal salt derived from an anthranilic acid, e.g. of the formula

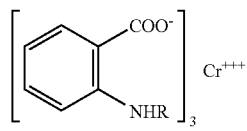

and of a polyamine which can be obtained via reaction of epichlorohydrin and of an aliphatic primary monoamine or of an N-alkylalkylenediamine, as described in EP-A-636636.

According to the invention, mixing of the polyethylene in the melt (compounding) takes place following the polymerization reaction. The temperatures during the mixing process are generally from 220 to 300° C., preferably from 240 to 270° C. The temperatures here are based on the melt temperatures in the mixing apparatus.

Mixing apparatus that can be used is any of the familiar extruders or kneaders capable of melting the polymer and homogenizing it with the added materials. Twin-screw extruders are preferred, in particular corotating twin-screw extruders.

The compounding process takes place with specific energy input of at least 0.17 kWh/kg, preferably from 0.18 to 0.35 kWh/kg, more preferably from 0.18 to 0.30 kWh/kg, particularly preferably from 0.19 to 0.30 kWh/kg. The specific energy input into the polyethylene is the ratio calculated from energy absorbed in kW and throughput of polymer through the mixing apparatus in kg/h.

The extrusion process preferably takes place in the absence of oxygen.

Absolute amounts of from 1000 to 2000 ppm of an antioxidant, based on the total polymer content, are added during the compounding process. It is preferable to use from 1200 to 1800 ppm, particularly from 1300 to 1700 ppm.

The antioxidant moreover comprises at least one sterically hindered phenol and at least one phosphite in a mixing ratio of from 1:5 to 5:1. The antioxidant preferably comprises the at least one sterically hindered phenol and the at least one phosphite in a mixing ratio of from 1:3 to 3:1, more preferably from 1:2 to 2:1, particularly preferably from 2:3 to 3:2.

In one preferred embodiment, the at least one sterically hindered phenol has been selected from pentaerythritol tetrakis[3-(3,5-di-tert-butyl-4-hydroxyphenyl)propionate] (Irganox 1010), tris(3,5-di-tert-butyl-4-hydroxybenzyl) isocyanurate (Irganox 3114), 1,3,5-trimethyl-2,4,6-tris(3,5-di-tert-butyl-4-hydroxybenzyl)benzene (Irganox 1330), particularly preferably pentaerythritol tetrakis[3-(3,5-di-tert-butyl-4-hydroxyphenyl)propionate] (Irganox 1010). Commercially available forms are pentaerythritol tetrakis[3-(3,5-di-tert-butyl-4-hydroxyphenyl)propionate] as Irganox 1010, tris(3,5-di-tert-butyl-4-hydroxybenzyl) isocyanurate as Irganox 3114, and 1,3,5-trimethyl-2,4,6-tris(3,5-di-tert-butyl-4-hydroxybenzyl)benzene as Irganox 1330.

In another preferred embodiment, the at least one phosphite has been selected from triphenyl phosphite, trinonylphenyl phosphite, tris(2,4-di-tert-butylphenyl) phosphite, distearyl pentaerythritol diphosphite, preferably tris-(2,4-di-tert-butylphenyl) phosphite. Commercially available forms are tris(2,4-di-tert-butylphenyl) phosphite as Irgafos 168 (product of Ciba Spezialitatenchemie), and distearyl pentaerythritol diphosphite as Weston 618 (product of Crompton).

The present invention also provides ethylene homo- or copolymers that can be prepared by the inventive process. These have particularly advantageous processing properties.

The density of the products prepared is preferably from 0.935 g/cm$^3$ to 0.960 g/cm$^3$, preferably from 0.940 g/cm$^3$ to 0.960 g/cm$^3$, particularly preferably from 0.945 g/cm$^3$ to 0.955 g/cm$^3$.

The polydispersity $M_w/M_n$ of the molding compositions is preferably from 12 to 27, more preferably from 15 to 25, particularly preferably from 16 to 23. The melt flow rate measured at 190° C. and with a load of 21.6 kg is preferably from 1 to 300 g/10 min, more preferably from 1 to 50 g/10 min, particularly preferably from 2 to 30 g/10 min.

The polyethylenes prepared with the aid of the process according to the present invention are particularly suitable for processing to give blown films, because they exhibit outstandingly good bubble stability. The present invention therefore also provides for the use of the ethylene homo- or copolymers for blown films, and provides blown films produced from the ethylene homo- or copolymers.

All of the documents mentioned are expressly incorporated by way of reference into this application. All of the percentage and ppm data in this application are based on weight, based on the total weight of the corresponding mixtures, unless otherwise stated.

The parameters used in this application were determined in the following way:

Intrinsic viscosity η, which is the limiting value of the viscosity number on extrapolation of polymer concentration to zero, was determined using an automatic Ubbelohde viscometer (Lauda PVS 1), using decalin as solvent at 135° C. according to ISO 1628.

To determine the breadth of molar mass distribution, gel permeation chromatography (GPC) was carried out at 140° C. in 1,2,4-trichlorobenzene, using a Waters 150C GPC apparatus. The data were evaluated using Win-GPC software from HS-Entwicklungsgesellschaft fOr wissenschaftliche Hard- and Software mbH, Ober-Hilbersheim. The columns were calibrated using polyethylene standards whose molar masses were from 100 to $10^7$ g/mol. The values determined were weight-average ($M_w$) and number-average ($M_n$) of the molar masses of the polymers and the ratio of weight average to number average ($M_w/M_n$).

The density of the polymer specimens was determined according to DIN EN ISO 1183-1, variant A.

Comonomer content of the polymer specimens was determined by means of NMR spectroscopy. The NMR specimens were drawn off under inert gas and melted. The internal standard used in the 1H and 13C NMR spectra was the solvent signals, the chemical shifts based on TMS.

Bubble stability was tested on an Alpine blown-film machine (diameter (D) 50 mm, length 21 D, die 120 mm Ø×1.00 mm). To this end, a film of thickness 20 μm was produced with a blow-up ratio (BUR) of 4:1 with a stalk length of 90 cm. Initial take-off speed was 35 m/min.

To measure bubble stability, the supply of support air was interrupted during the blown-film process. This causes the bubble to oscillate, and the oscillation of the bubble must in turn reduce when the support air is again switched on. The oscillation displacement at the start of bubble expansion was in the range±2 cm over an observation period of one minute, the test was considered as completed and passed at that speed level.

A shock test was then carried out at the same speed level. For the shock test, the bubble was made to oscillate vertically. This was achieved via complete opening of the iris diaphragm on the cooling-air blower over a period of about 7 s. After this period the equipment was reset to the initial position, where the controlling factor was of the pressure of the cooling air. In the shock test, the oscillations of the film bubble must have reduced to ±2 cm within 2 min, in which case the test was considered completed and passed. The system was then adjusted to the next higher take-off speed.

When the shock test or the test prior to shock is not passed at a particular take-off speed, the stability grade corresponding to the next lower take-off speed is awarded.

The following system was used to award the stability grade:

| Take-off speed [m/min] | Stability grade |
|---|---|
| 87 (8 μm) | 1 |
| 77 (9 μm) | 2 |
| 70 (10 μm) | 3 |
| 63 (11 μm) | 4 |
| 58 (12 μm) | 5 |
| 35 (20 μm) | 6 |

Dart drop impact (DDI) was determined according to ASTM D1709, method A, on a film of thickness 20 μm.

Melt flow rate ($MFR_{21}$) was measured according to ISO 1133 at a temperature of 190° C. and with a load of 21.6 kg.

The invention is illustrated in more detail below using examples, but is not restricted thereto.

EXAMPLE 1

Preparation of Catalyst Precursor

A solution composed of 8.1 g of chromium nitrate nonahydrate (1.05 g of Cr) in 500 ml of methanol was added, with stirring, to 150 g of SG332 5N silica gel (product of Grace GmbH, Worms, Germany). The resultant suspension was stirred for 30 min. The solvent was then drawn off in vacuo at 70° C.

EXAMPLE 2

Activation of Chromium Catalyst

The catalyst precursor obtained in example 1 was activated by the following steps under a nitrogen and, respectively, air current:

1st step=heating to 100° C. within a period of 1 h
2nd step=heating to 150° C. within a period of 1 h
3rd step=keep at 150° C. for 30 min
4th step=heating to 300° C. within a period of 2 h 30 min
  The switch-over from nitrogen to air took place at 300° C.
5th step=heating to 350° C. within a period of 3 h (heating rate: 0.28° C./min)
6th step=heating to 500° C. within a period of 2 h 5 min (heating rate: 1.2° C./min)
7th step=heating to 550° C. within a period of 1 h (heating rate: 0.83° C./min)
8th step=keep at 550° C. for 5 h
9th step=from 6 to 7 h of cooling to room temperature
  Once 300° C. had been reached, the reverse switch-over from air to nitrogen was made.

EXAMPLE 3

Polymerization

Ethylene was polymerized at 116° C., using the chromium catalyst prepared in example 2.

The polymerization reaction took place in a fluidized-bed gas-phase reactor with output 35 kg/h. The density of the polyethylene prepared was in each case 0.951 g/cm³.

Table 1 collates the conditions for the polymerization reactions.

When experiment 1 is compared with 3, 5 and 7 it can be seen that a calcining temperature of 600° C. does not give good bubble stabilities, but that they are obtained at higher activation temperatures.

EXAMPLE 4

Compounding

The Basell catalyst precursor Avant C 230 was used to carry out a series of experiments with controlled variation of catalyst activation conditions and of polymerization conditions in a pilot-plant reactor, and also of compounding conditions. The compounding process used two different extruder screw combinations in a ZSK 40 (Werner & Pfleiderer) and in each case a 1600 ppm Irganox B215 were used for stabilization.

Figure 2:
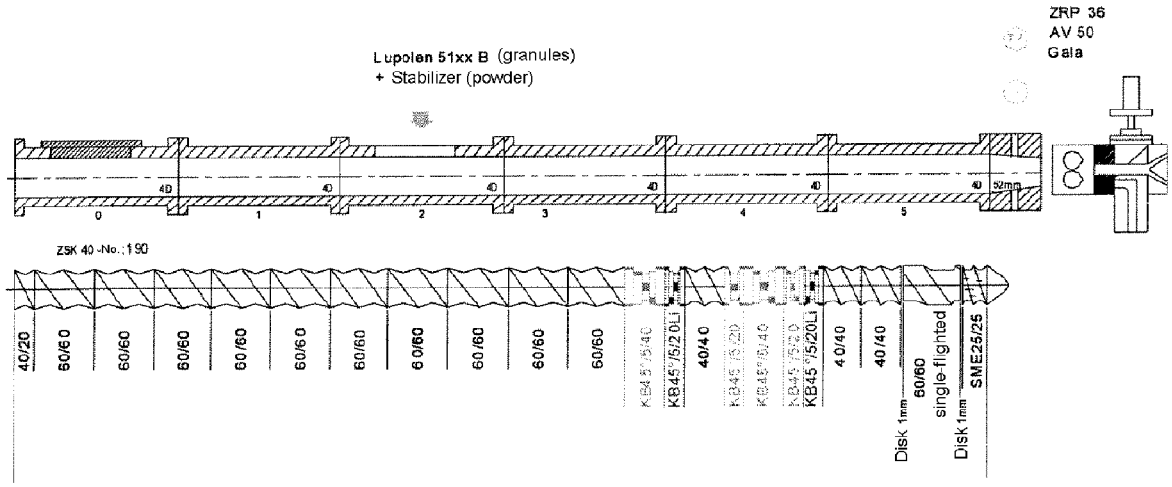
FIG. 2 illustrates a ZSK 40 extruder using screw B and gear pump in a compounding process.

The extruder was used in two different configurations. Firstly with screw A as shown in FIG. 1 and secondly with screw B and gear pump as shown in FIG. 2.

The results are collated in tables 1 and 2.

EXAMPLE 6

Compounding

The ratio of Irganox 1010 (phenol) to Irganox 168 (phosphite) was varied with an identical total amount of stabilizer, under compounding conditions based on those of example 5. Table 3 shows the results. It can be seen that pure phenol and pure phosphite are unsuitable, whereas a ratio of from 1:5 to 5:1 gives suitable bubble stabilities.

TABLE 1

| | \multicolumn{12}{c}{Experiment No.} | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Cr [% by weight] | 0.7 | 0.7 | 0.7 | 0.7 | 0.7 | 0.7 | 0.7 | 0.7 | 0.7 | 0.7 | 0.7 | 0.7 |
| Act. T [° C.] | 600 | 600 | 650 | 650 | 630 | 630 | 630 | 630 | 630 | 630 | 630 | 630 |
| THA [g/h] | 0.15 | 0.15 | 0.3 | 0.3 | 0.15 | 0.15 | 0.25 | 0.25 | 0.25 | 0.25 | 0.3 | 0.3 |
| $H_2$ [% by volume] | 0 | 0 | 0 | 0 | 0 | 0 | 0 | 0 | 0 | 0 | 0 | 0 |
| Costelan [ppm] | 8 | 8 | 8 | 8 | 3 | 3 | 8 | 8 | 8 | 8 | 15 | 15 |
| η [dl/g] | 3.32 | 3.32 | 3.23 | 3.35 | 3.2 | 3.24 | 3.18 | 3.09 | 3.27 | 3.09 | 3.29 | 3.44 |
| $M_z$ [$10^3$ g/mol] | 2842 | 2055 | 2432 | 2798 | 2637 | 2689 | 2383 | 2957 | 1778 | 2272 | 2204 | 3722 |
| $M_w$ [$10^3$ g/mol] | 318.6 | 259.6 | 285.9 | 317.8 | 298.8 | 323.1 | 287.3 | 328.3 | 250.6 | 283.7 | 266.8 | 375.1 |
| $M_n$ [$10^3$ g/mol] | 12.22 | 13.04 | 12.95 | 13.92 | 13.99 | 17.66 | 12.60 | 14.34 | 15.93 | 1.914 | 11.45 | 14.58 |
| $M_w/M_n$ | 26.1 | 19.9 | 22.1 | 22.8 | 21.4 | 18.3 | 22.8 | 22.9 | 15.7 | 14.8 | 23.3 | 25.7 |
| $MFR_{21}$ [g/10 min] | 10.8 | 10.8 | 10.7 | 10.9 | 10.1 | 10.5 | 11.5 | 11 | 10.7 | 13.6 | 11.6 | 11.4 |
| Screw | B | A | B | A | B | A | B | A | A | B | B | A |
| Bubble stability | 6 | 6 | 1 | 6 | 1 | 6 | 1 | 6 | 6 | 3 | 6 | 6 |
| DDI [g] | 210 | 150 | 180 | 160 | 180 | 170 | 160 | 150 | | 170 | 180 | 160 |

On comparison of experiments 3, 5, and 7 with experiments 4, 6, and 8 it can be clearly seen that only screw geometry B gives good bubble stabilities, because this screw introduces sufficient specific energy into the polymer.

EXAMPLE 5

Compounding

Stabilization was varied during the compounding process in a ZSK 40, using screw B and gear pump. Irganox 6215 (product of Ciba Spezialitätenchemie, 1:2 mixture of a phenol with phosphite) was used as stabilizer. The results are collated in table 2.

TABLE 2

| | | \multicolumn{6}{c}{Experiment No.} | | | | | |
|---|---|---|---|---|---|---|---|
| | | 1 | 2 | 3 | 4 | 5 | 6 |
| Irganox B215 | [ppm] | 810 | 1221 | 1526 | 1837 | 2228 | 1525 |
| Zone | 1 | 193 | 200 | 200 | 200 | 200 | 200 |
| temperatures | 2 | 196 | 200 | 200 | 200 | 200 | 202 |
| [° C.] | 3 | 217 | 219 | 219 | 219 | 214 | 228 |
| | 4 | 233 | 223 | 224 | 224 | — | — |
| | GP | 240 | 240 | 240 | 240 | 240 | 240 |
| | AV | 240 | 240 | 240 | 240 | 240 | 240 |
| | LP | 220 | 216 | 220 | 220 | 219 | 220 |
| | before GP | | 240 | 242 | 249 | 242 | 255 |
| Water | ° C. | 55 | 50 | 50 | 50 | 51 | 52 |
| Speed | [1/min] | 130 | 130 | 130 | 130 | 130 | 185 |
| Power | [kW] | 8 | 8 | 8 | 7.7 | 8 | 8.9 |
| Throughput | [kg/h] | 39.47 | 39.33 | 39.33 | 39.2 | 39.47 | 39.3 |
| Spec. energy | [kWh/kg] | 0.200 | 0.200 | 0.200 | 0.192 | 0.200 | 0.222 |
| Pressure | bar | 340 | 338 | 339 | 338 | 336 | 331 |
| Bubble stability | grade | 6 | 2 | 1 | 1 | 4 | 1 |
| DDI | g | 110 | 170 | 180 | 170 | 170 | 180 |

TABLE 3

| | | \multicolumn{6}{c}{Experiment No.} | | | | | |
|---|---|---|---|---|---|---|---|
| | | 1 | 2 | 3 | 4 | 5 | 6 |
| Irganox 1010 | [ppm] | 0 | 407 | 1118 | 813 | 508 | 1626 |
| Irgafos 168 | [ppm] | 1628 | 407 | 508 | 813 | 1118 | 0 |
| Zone temperatures [° C.] | 1 | 200 | 200 | 200 | 200 | 200 | 200 |
| | 2 | 200 | 199 | 200 | 200 | 200 | 201 |
| | 3 | 224 | 224 | 225 | 224 | 224 | 225 |
| | 4 | 200 | 200 | 200 | 200 | 200 | 200 |
| | GP | 240 | 240 | 240 | 240 | 240 | 240 |
| | AV | 240 | 240 | 240 | 240 | 240 | 240 |
| | LP | 220 | 220 | 220 | 220 | 220 | 220 |
| | before GP | 243 | 243 | 241 | 241 | 243 | 241 |
| Water | ° C. | 66 | 67 | 67 | 67 | 66 | 68 |
| Speed | [1/min] | 140 | 140 | 140 | 140 | 140 | 140 |
| Power | [kW] | 8.0 | 7.9 | 7.9 | 7.9 | 8.0 | 7.8 |
| Throughput | [kg/h] | 39.3 | 39.3 | 39.3 | 39.3 | 39.3 | 39.3 |
| Spec. energy | [kWh/kg] | 0.200 | 0.198 | 0.198 | 0.198 | 0.200 | 0.195 |
| Pressure | bar | 329 | 327 | 329 | 323 | 328 | 332 |
| Bubble stability | grade | 6 | 6 | 3 | 2 | 3 | 6 |
| DDI | g | 150 | 100 | 120 | 120 | 160 | 40 |

The invention claimed is:

1. A process for preparation of ethylene homopolymers or copolymers, comprising the steps of
    a) polymerizing in a single reactor ethylene or ethylene with one or more other 1-olefins in the presence of a chromium catalyst at a temperature within the range of 20 to 200° C. and at a pressure within the range of 0.1 to 20 MPa, where the chromium catalyst can be prepared via application of one or more chromium compounds to a silicate support and subsequent thermal activation under oxidative conditions at a temperature within the range of 620 to 900° C., and
    b) mixing the polyethylene in the melt with from 1000 to 2000 ppm of an antioxidant comprising at least one sterically hindered phenol and at least one phosphite in a mixing ratio of from 1:5 to 5:1, with specific energy input of at least 0.17 kWh/kg, wherein the polymerization takes place in the presence of from 1 to 12 ppm of an antistatic agent.

2. The process according to claim 1, where the polymerization takes place in the gas phase.

3. The process according to claim 1, wherein the mixing in the melt takes place in an extruder.

4. The process according to claim 3, wherein the extrusion takes place with specific energy input of from 0.18 to 0.35 kWh/kg.

5. The process according to claim 1, wherein the antioxidant comprises the at least one sterically hindered phenol and the at least one phosphite in a mixing ratio of from 1:3 to 3:1.

6. The process according to claim 5, wherein the sterically hindered phenol is selected from the group consisting of pentaerythritol tetrakis[3-(3,5-di-tert-butyl -4-hydroxyphenyl)propionate], tris(3,5-di-tert-butyl-4-hydroxybenzyl) isocyanurate, 1,3,5-trimethyl-2,4,6-tris(3,5-di-tert-butyl-4-hydroxybenzyl)benzene and mixtures thereof.

7. The process according to claim 5, wherein the phosphite is selected from the group consisting of triphenyl phosphite, trinonylphenyl phosphite, tris(2,4-di-tert-butylphenyl) phosphite, distearyl pentaerythritol diphosphite, and mixtures thereof.

8. An ethylene homo- or copolymer prepared by the process according to claim 1.

9. Blown film produced from the ethylene homo- or copolymers according to claim 8.

10. The process of claim 1 wherein the antistatic agent is selected from mixtures of a polysulfone copolymer, a polyamine and a long-chain sulfonic acid; ZnO; MgO or mixtures thereof.

* * * * *